(12) United States Patent
Sekiguchi et al.

(10) Patent No.: US 7,860,266 B2
(45) Date of Patent: Dec. 28, 2010

(54) IMAGE PROCESSING SYSTEM AND IMAGE PROCESSING METHOD

(75) Inventors: Kenzou Sekiguchi, Machida (JP); Yushi Matsukubo, Yokohama (JP); Hiroyuki Yaguchi, Yokohama (JP); Eiichi Nishikawa, Kawasaki (JP); Hiroyuki Tsuji, Yokohama (JP); Shinichi Kato, Kawasaki (JP); Masakazu Kitora, Kawasaki (JP); Hiroyoshi Yoshida, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 830 days.

(21) Appl. No.: 11/174,573

(22) Filed: Jul. 6, 2005

(65) Prior Publication Data

US 2006/0008114 A1     Jan. 12, 2006

(30) Foreign Application Priority Data

Jul. 7, 2004     (JP) .............................. 2004-200807

(51) Int. Cl.
*G06K 9/00* (2006.01)
(52) U.S. Cl. ........................ 382/100; 382/173; 382/176; 382/180; 382/242; 382/243; 382/251; 382/253; 382/232; 382/181; 358/448; 358/1.15
(58) Field of Classification Search ................. 382/173, 382/176, 180, 232, 242, 243, 251, 253, 100, 382/181; 358/448, 1.15
See application file for complete search history.

(56) References Cited

U.S. PATENT DOCUMENTS

| | | | |
|---|---|---|---|
| 4,759,075 A * | 7/1988 | Lipkie et al. ................. | 382/288 |
| 4,908,873 A | 3/1990 | Philibert et al. ............... | 382/34 |
| 4,935,821 A | 6/1990 | Sano et al. .................. | 358/427 |
| 5,062,074 A | 10/1991 | Kleinberger ................. | 364/900 |
| 5,251,268 A | 10/1993 | Colley et al. .................. | 382/14 |
| 5,642,435 A | 6/1997 | Loris .......................... | 382/229 |
| 5,761,655 A | 6/1998 | Hoffman ....................... | 707/4 |
| 5,761,689 A | 6/1998 | Rayson et al. ............... | 707/533 |
| 5,848,186 A | 12/1998 | Wang et al. .................. | 382/176 |
| 5,859,662 A | 1/1999 | Cragun et al. ................. | 348/13 |
| 5,890,808 A | 4/1999 | Neff et al. .................... | 382/209 |
| 5,995,978 A | 11/1999 | Cullen et al. ................. | 707/104 |
| 6,043,823 A | 3/2000 | Kodaira et al. .............. | 345/433 |

(Continued)

FOREIGN PATENT DOCUMENTS

CN     1276569     12/2000

(Continued)

OTHER PUBLICATIONS

Scalable Vector Graphics (SVG) 1.1 Specification W3C Recommendation Jan. 14, 2003 http://www.w3c.org/TR/SVG11/.

*Primary Examiner*—Vikkram Bali
*Assistant Examiner*—Julian D Brooks
(74) *Attorney, Agent, or Firm*—Fitzpatrick, Cella, Harper & Scinto

(57) ABSTRACT

This invention provides an image processing system and image processing method which allow a user to easily confirm conversion result information when image information is converted into vector data. Image information input from an input device (113) is vectorized by a data processing device (115). Vector data which has successfully been vectorized is converted into image data. The input image information and the converted image data are combined to generate and output combined image data.

8 Claims, 20 Drawing Sheets

U.S. PATENT DOCUMENTS

| | | | | |
|---|---|---|---|---|
| 6,104,500 | A | 8/2000 | Alam et al. | 358/1.15 |
| 6,138,156 | A | 10/2000 | Fletcher et al. | 709/224 |
| 6,275,610 | B1 | 8/2001 | Hall, Jr. et al. | 382/180 |
| 6,275,850 | B1 | 8/2001 | Beyda et al. | 709/206 |
| 6,301,586 | B1 | 10/2001 | Yang et al. | 707/104 |
| 6,360,252 | B1 | 3/2002 | Rudy et al. | 709/206 |
| 6,397,213 | B1 | 5/2002 | Cullen et al. | 707/5 |
| 6,434,552 | B1 | 8/2002 | Leong | 707/4 |
| 6,466,694 | B2 | 10/2002 | Kamada et al. | 382/181 |
| 6,470,336 | B1 | 10/2002 | Matsukawa et al. | 707/4 |
| 6,580,820 | B1 | 6/2003 | Fan | 382/135 |
| 6,658,145 | B1 | 12/2003 | Silver et al. | 382/149 |
| 6,687,741 | B1 | 2/2004 | Ramaley et al. | 709/206 |
| 6,707,568 | B1 | 3/2004 | Yu | 358/1.15 |
| 6,741,743 | B2 | 5/2004 | Stalcup et al. | 382/217 |
| 6,782,402 | B1 | 8/2004 | Hidaka et al. | 707/203 |
| 6,799,717 | B2 | 10/2004 | Harris | 235/375 |
| 6,930,803 | B1 | 8/2005 | Suzuki | 358/471 |
| 6,944,344 | B2 | 9/2005 | Imagawa et al. | 382/229 |
| 6,944,815 | B2 | 9/2005 | Bierbrauer et al. | 715/500 |
| 6,977,754 | B2 | 12/2005 | Matsumoto et al. | 358/1.9 |
| 7,085,437 | B2 | 8/2006 | Nakajima et al. | 382/311 |
| 7,203,364 | B2 | 4/2007 | Yamazaki | 382/177 |
| 7,240,077 | B1 | 7/2007 | Edelman et al. | 707/203 |
| 7,248,744 | B2 | 7/2007 | Cockshott | 382/253 |
| 2001/0014164 | A1* | 8/2001 | Daniels et al. | 382/101 |
| 2002/0003633 | A1* | 1/2002 | Matsumoto et al. | 358/1.9 |
| 2002/0037100 | A1 | 3/2002 | Toda et al. | 382/166 |
| 2002/0071606 | A1 | 6/2002 | Watanabe et al. | 382/177 |
| 2002/0141660 | A1 | 10/2002 | Bellavita et al. | 382/309 |
| 2002/0196465 | A1 | 12/2002 | Ohta | 358/1.16 |
| 2003/0019922 | A1 | 1/2003 | Kuo et al. | 235/375 |
| 2003/0031371 | A1 | 2/2003 | Kato et al. | 382/239 |
| 2003/0046352 | A1 | 3/2003 | Katsuda et al. | 709/206 |
| 2003/0050933 | A1 | 3/2003 | DeSalvo | 707/102 |
| 2003/0051044 | A1 | 3/2003 | Parry et al. | 709/231 |
| 2003/0072500 | A1 | 4/2003 | Sugegaya et al. | 382/305 |
| 2003/0085162 | A1 | 5/2003 | Daniels, Jr. et al. | 209/584 |
| 2003/0107771 | A1 | 6/2003 | Shibata | 358/3.28 |
| 2003/0197891 | A1 | 10/2003 | Honda | 358/1.15 |
| 2004/0010419 | A1 | 1/2004 | Sinnott | 705/2 |
| 2004/0083434 | A1* | 4/2004 | Fitch | 715/541 |
| 2004/0085327 | A1* | 5/2004 | Jones et al. | 345/591 |
| 2004/0090641 | A1 | 5/2004 | Namikata | 358/1.9 |
| 2004/0137416 | A1 | 7/2004 | Ma et al. | 434/365 |
| 2004/0141613 | A1 | 7/2004 | Hayashi | 380/28 |
| 2004/0148274 | A1 | 7/2004 | Warnock et al. | 707/2 |
| 2004/0151377 | A1 | 8/2004 | Boose et al. | 382/193 |
| 2004/0250083 | A1 | 12/2004 | Schwab | 713/182 |
| 2005/0010868 | A1 | 1/2005 | Schowtka et al. | 715/517 |
| 2005/0015379 | A1 | 1/2005 | Aureglia et al. | 707/100 |
| 2005/0018237 | A1 | 1/2005 | Cossel et al. | 358/1.15 |
| 2005/0023355 | A1 | 2/2005 | Barrus | 235/462.15 |
| 2005/0071676 | A1 | 3/2005 | Park et al. | 713/201 |
| 2005/0089229 | A1 | 4/2005 | Morishia | 382/218 |
| 2005/0111052 | A1 | 5/2005 | Nishikawa et al. | 358/448 |
| 2005/0111053 | A1 | 5/2005 | Yoshida et al. | 358/448 |
| 2005/0123209 | A1 | 6/2005 | Kitora et al. | 382/243 |
| 2005/0134906 | A1 | 6/2005 | Takashima | 358/1.15 |
| 2005/0144136 | A1 | 6/2005 | Murashita | 705/51 |
| 2005/0262243 | A1 | 11/2005 | Ternasky et al. | 709/225 |
| 2005/0271296 | A1 | 12/2005 | Tsuji et al. | 382/275 |
| 2005/0286805 | A1 | 12/2005 | Yoshida | 382/305 |
| 2005/0288943 | A1 | 12/2005 | Wei et al. | 705/1 |
| 2006/0007481 | A1 | 1/2006 | Kato et al. | 358/1.15 |
| 2006/0008113 | A1 | 1/2006 | Matsukubo et al. | 382/100 |
| 2006/0010115 | A1 | 1/2006 | Yoshida et al. | 707/3 |
| 2006/0010116 | A1 | 1/2006 | Yaguchi et al. | 707/3 |
| 2006/0116993 | A1 | 6/2006 | Oguri et al. | 707/3 |
| 2006/0143153 | A1 | 6/2006 | Mifune et al. | 707/1 |
| 2007/0230810 | A1* | 10/2007 | Kanatsu | 382/243 |
| 2009/0097765 | A1* | 4/2009 | Kimura et al. | 382/243 |

FOREIGN PATENT DOCUMENTS

| | | | |
|---|---|---|---|
| CN | 1277410 | | 12/2000 |
| EP | 1 058 199 A2 | | 12/2000 |
| GB | 2313729 A | * | 3/1997 |
| JP | 2-184173 | | 7/1990 |
| JP | 4-34650 | | 2/1992 |
| JP | 4-302073 | | 10/1992 |
| JP | 5-12402 | | 1/1993 |
| JP | 5-28254 | | 2/1993 |
| JP | 5-303644 | | 11/1993 |
| JP | 5-334430 | | 12/1993 |
| JP | 5-342408 | | 12/1993 |
| JP | 6-46271 | | 2/1994 |
| JP | 6-119448 | | 4/1994 |
| JP | 6-178066 | | 6/1994 |
| JP | 6-270477 | | 9/1994 |
| JP | 6-290264 | | 10/1994 |
| JP | 7-36433 | | 2/1995 |
| JP | 7-85221 | | 3/1995 |
| JP | 8-242326 | | 9/1996 |
| JP | 9-50433 | | 2/1997 |
| JP | 10-293737 | | 11/1998 |
| JP | 11-143794 | | 5/1999 |
| JP | 11-185018 | | 7/1999 |
| JP | 11-232296 | | 8/1999 |
| JP | 11-284835 | | 10/1999 |
| JP | 11-312244 | | 11/1999 |
| JP | 2000-261574 | | 9/2000 |
| JP | 2000-322425 | | 11/2000 |
| JP | 2001-57631 | | 2/2001 |
| JP | 2001-144940 | | 5/2001 |
| JP | 2001-218030 | | 8/2001 |
| JP | 2001-245144 | | 9/2001 |
| JP | 2003-22307 | | 1/2003 |
| JP | 2003-107119 | | 4/2003 |
| JP | 2003-134327 | | 5/2003 |
| JP | 2003-169169 | | 6/2003 |
| JP | 2003-248832 | | 9/2003 |

* cited by examiner

FIG. 4

```
<?xml version= "1.0" standalone= " no " ?>
<!DOCTYPE svg PUBLIC "-//W3C//DTD SVG 20010904//EN"
"http://www.w3.org/TR/2001/REC-SVG-20010904/DTD/svg10.dtd">
<svg width="12cm"eight="14cm">
<circle cx="6cm" cy="7cm" r="4cm" f111="none"stroke="blue"/>
</svg>
```

FIG. 8

BLOCK INFORMATION

| | PROPERTY | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

PROPERTY  1 : text  2 : picture  3 : table  4 : line  5 : photo

INPUT FILE INFORMATION

| TOTAL NUMBER OF BLOCKS | N(=6) |
|---|---|

FIG. 16

```
*********************************************
 *  VECTOR DATA CONVERSION  *
         RESULT REPORT
*********************************************
```

TOTAL NUMBER OF CONVERTED     4 PIECES
OBJECTS (EXCEPT NUMBER OF CHARACTERS)

NUMBER OF REGIONS INCLUDING     3
CHARACTER STRINGS

NUMBER OF TEXT OBJECTS     45 PIECES

NUMBER OF TABLE OBJECTS     0 PIECES

NUMBER OF GRAPHIC OBJECTS     1 PIECES

NUMBER OF IMAGE OBJECTS     1 PIECES

```
from: fax_mail_machine@mail_srv.ccc.dd.ee
To: fff@mail_srv.ccc.dd.ee
Subject: VECOTOR PROC. DATA
Mime-Version: 1.0
Content-type: Multipart/Mixed;
boundary="---Boundary---"
Date: Nov, 29 Jun 2003 15:53:00 +0999
Message-Id: <20031129155300.TAA99999@mail_srv.ccc.dd.ee>
```

171 — ---Boundary---
Content-type: text/plain; charset=iso-2022-jp
  [ MAIL CONTENTS ] VECTORIZATION IS COMPLETE
  [ JOB NUMBER ] VECT9999
  [ MFP NAME ] IRC3200X
  [ PROCESS DATE/TIME ] NOVEMBER 29, 2003, 15:50
  [ PROCESS TIME ] 1 MIN 30 SEC
  [ ATTACHED FILE ] ORIGINAL IMAGE FILE AND VECTORIZED DATA FILE
                    ARE ATTACHED
**************************************************
\* VECTOR DATA CONVERSION RESULT REPORT \*
**************************************************

| | |
|---|---|
| TOTAL NUMBER OF CONVERTED OBJECTS (EXCEPT NUMBER OF CHARACTERS) | 4 PIECES |
| NUMBER OF REGIONS INCLUDING CHARACTER STRINGS | 3 PIECES |
| NUMBER OF TEXT OBJECTS | 45 PIECES |
| NUMBER OF TABLE OBJECTS | 0 PIECES |
| NUMBER OF GRAPHIC OBJECTS | 1 PIECES |
| NUMBER OF IMAGE OBJECTS | 1 PIECES |

172 — ---Boundary---
Content-Type: image/tiff
Content-Transfer-Encoding: base64
Content-Disposition: inline: filename="iRC3200_9999.tif"

ORIGINAL IMAGE DATA ENCODED BY base64

173 — ---Boundary---

174 — ---Boundary---
Content-Type: image/svg-xml
Content-Transfer-Encoding: base64
Content-Disposition: inline: filename="iRC3200_9999.svg"

SVG IMAGE DATA ENCODED BY base64

175 — ---Boundary---

FIG. 18 from: fax_mail_machine@mail_srv.ccc.dd.ee
To: fff@mail_srv.ccc.dd.ee
Subject: VECOTOR PROC. DATA
Mime-Version: 1.0
Content-type: Multipart/Mixed;
boundary="---Boundary---"
Date: Nov, 29 Jun 2003 15:53:00 +0999
Message-Id: <20031129155300.TAA99999@mail_srv.ccc.dd.ee>

181 —  ---Boundary---
Content-type: text/plain; charset=iso-2022-jp

[ MAIL CONTENTS ] VECTORIZATION IS COMPLETE
[ JOB NUMBER ] VECT9999
[ MFP NAME ] IRC3200X
[ PROCESS DATE/TIME ] NOVEMBER 29, 2003, 15:50
[ PROCESS TIME ] 1 MIN 30 SEC
[ ATTACHED FILE ] VECTORIZATION PROCESS RESULT COMBINED
                  IMAGE IS ATTACHED

*****************************************************
* VECTOR DATA CONVERSION RESULT REPORT *
*****************************************************
TOTAL NUMBER OF CONVERTED                4 PIECES
OBJECTS (EXCEPT NUMBER OF CHARACTERS)

NUMBER OF REGIONS INCLUDING      3 PIECES
CHARACTER STRINGS

NUMBER OF TEXT OBJECTS           45 PIECES
NUMBER OF TABLE OBJECTS          0 PIECES
NUMBER OF GRAPHIC OBJECTS        1 PIECES
NUMBER OF IMAGE OBJECTS          1 PIECES

182 —  ---Boundary---
Content-Type: image/jpg
Content-Transfer-Encoding: base64
Content-Disposition: inline: filename="iRC3200_9999.jpg"

VECTORIZATION PROCESS RESULT COMBINED IMAGE ENCODED BY base64

183 —  ---Boundary---

FIG. 19

```
<HTML>
 <HEAD>
  <TITLE>VECTOR PROC. DATA</TITLE>
 </HEAD>
 <BODY>
   < H2 > VECTORIZATION IS COMPLETE </ H2 >
    < P > [ JOB NUMBER ] VECT9999
    < P > [ MFP NAME ] IRC3200X
    < P > [ PROCESS DATE/TIME ] NOVEMBER 29, 2003, 15:50
    < P > [ PROCESS TIME ] 1 MIN 30 SEC
    < P > [ ATTACHED FILE ] ORIGINAL IMAGE FILE AND VECTORIZED DATA FILE
                         ARE ATTACHED < /P >
   < H2 >********ORIGINAL IMAGE********< /H2 >
   <P><IMG src="images/iRC3200_9999.tif" ></P>
   < H2 >********VECTOR DATA********< /H2 >
   <P><IMG src="images/iRC3200_9999.svg" ></P>
   < H2 >********VECTOR DATA CONVERSION RESULT REPORT********< /H2 >

<P> TOTAL NUMBER OF CONVERTED
       OBJECTS (EXCEPT NUMBER OF CHARACTERS):   4 PIECES
   <P> NUMBER OF REGIONS INCLUDING
       CHARACTER STRINGS:                       3 PIECES
   <P> NUMBER OF TEXT OBJECTS:                  45 PIECES
   <P> NUMBER OF TABLE OBJECTS:                 0 PIECES
   <P> NUMBER OF GRAPHIC OBJECTS:               1 PIECES
   <P> NUMBER OF IMAGE OBJECTS:                 1 PIECES
 </BODY>
</HTML>
```

IMAGE PROCESSING SYSTEM AND IMAGE PROCESSING METHOD

FIELD OF THE INVENTION

The present invention relates to an image processing system and image processing method, which convert input image information into vector data reusable by general-purpose document creation application software.

BACKGROUND OF THE INVENTION

Along with a recent growing interest in environmental issues, move to paperless offices has rapidly been promoted. For this purpose, there is conventionally known a document management system which reads paper documents accumulated in binders by using a scanner, converts the read images into portable document format (to be abbreviated as "PDF" hereinafter) data, and accumulates them in an image storage device as a database.

An image processing system is also known, which reads a paper document by using a scanner and executes image processing such as OCR (Optical Character Recognition) and edge extraction for characters, graphics, and tables on the document so that the characters, graphics, and tables can be generated as vector data (e.g., Japanese Patent Laid-Open No. 5-342408).

In the above-described conventional image processing system to generate vector data, however, if a user wants to confirm objects in a vectorized image, he/she must visually confirm the vectorized portions by using a display device.

In an inexpensive image processing system (e.g., a digital multifunction peripheral (MFP) such as a copying machine or facsimile apparatus having a multifunction) which can hardly incorporate an expensive display device, vector data converted from image information is temporarily transferred to a personal computer (PC) connected to the image processing system. The vector data is displayed on the PC or printed by a printer. However, when the vector data is simply displayed on the PC or printed by a printer, only an image close to the original image is displayed or printed. Portions converted into vector data cannot be discriminated.

Additionally, when a vectorization process is executed, information such as the process type and process amount cannot be obtained.

SUMMARY OF THE INVENTION

The present invention has been proposed to solve the conventional problems, and has as its object to provide an image processing system and image processing method which allow a user to easily confirm conversion result information when image information is converted into vector data.

In order to solve the above-described problems, according to the present invention, there is provided an image processing system comprising:
an input unit adapted to input image information;
a vectorization unit adapted to vectorize the image information; and
an output unit adapted to output the image information to a printing device so as to identify that the image information is vectorized.

In order to solve the above-described problems, according to the present invention, there is also provided an image processing method comprising:
an input step of inputting image information to an image processing device;
a vectorization step of vectorizing the image information; and
an output step of outputting the image information to a printing device so as to identify that the image information is vectorized.

In order to solve the above-described problems, according to the present invention, there is also provided an image processing system comprising:
an input unit adapted to input image information;
a vectorization unit adapted to vectorize the image information input by the input unit; and
an output unit adapted to output a result report representing a vectorization process result by the vectorization unit.

In order to solve the above-described problems, according to the present invention, there is also provided an image processing method comprising:
an input step of inputting image information to an image processing device;
a vectorization step of vectorizing the image information input in the input step; and
an output step of outputting a result report representing a vectorization process result in the vectorization step.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 4 is a view showing an example of SVG vector data as data after vector conversion;

FIG. 8 is a table showing an example of block information of respective blocks obtained by the block selection process;

FIG. 16 is a view showing conversion result information obtained by creating a report of the vector conversion result;

FIG. 17 is a view showing an example of e-mail data;

FIG. 18 is a view showing an example of e-mail data converted from combined image data;

FIG. 19 is a view showing an example of HTML data; and

DETAILED DESCRIPTION OF THE PREFERRED EMBODIMENT

An image processing system and image processing method according to a preferred embodiment of the present invention will be described below with reference to the accompanying drawings.

Figure 1:
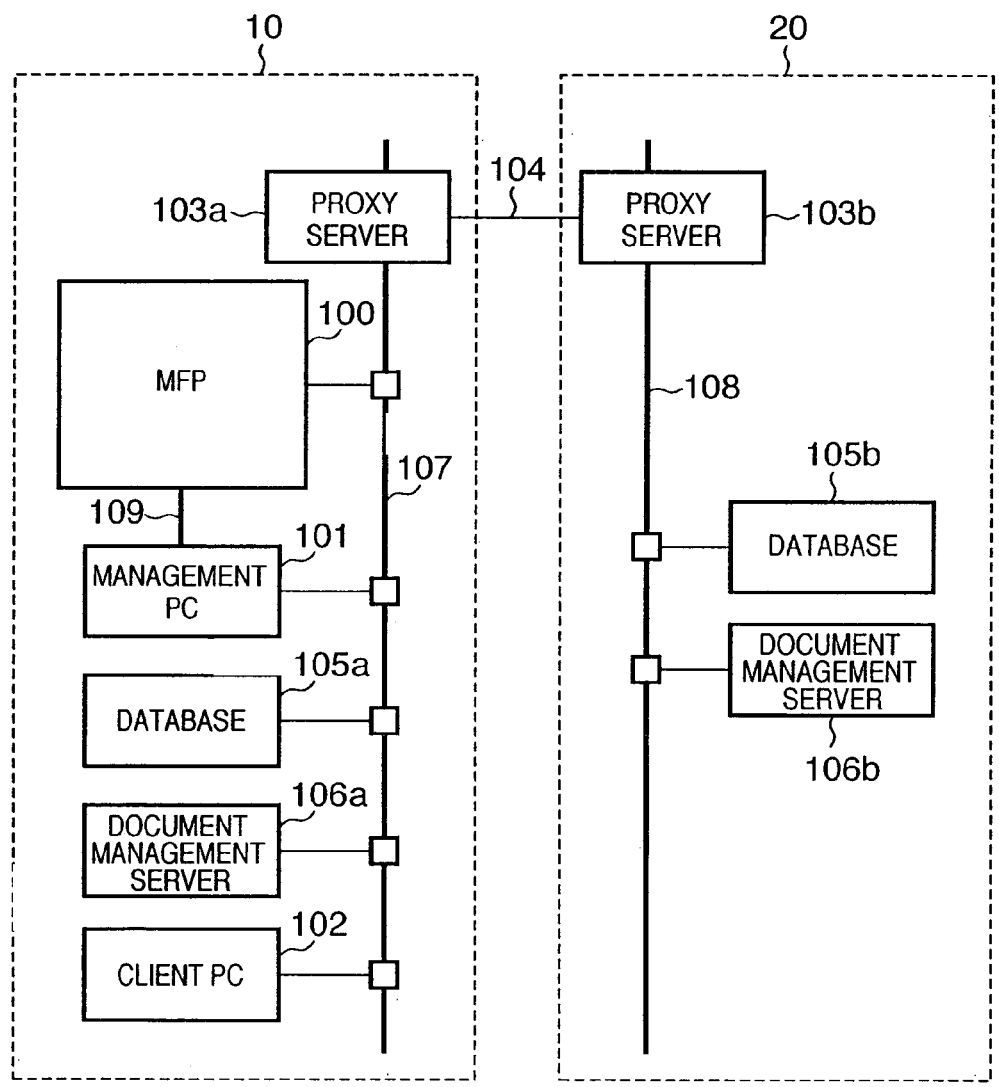
FIG. 1 is a block diagram showing the arrangement of an image processing system according to an embodiment of the present invention.

FIG. 1 is a block diagram showing the arrangement of an image processing system according to an embodiment of the present invention. The image processing system shown in FIG. 1 is implemented in an environment in which offices 10 and 20 are connected via an network 104 such as the Internet.

A digital multifunction peripheral (MFP) 100, a management PC 101 which controls the MFP 100, a client PC 102, a document management server 106a, a database 105a, and a proxy server 103a are connected to a LAN 107 formed in the office 10. The MFP 100 can be implemented by, e.g., a copying machine or facsimile apparatus having a multifunction. A document management server 106b, database 105b, and proxy server 103b are connected to a LAN 108 formed in the office 20. The client PC 102 comprises an external storage unit, search image input unit, and search result output unit. The LAN 107 and the LAN 108 in the office 20 are connected to the network 104 such as the Internet via the proxy servers 103a and 103b, respectively.

The MFP 100 in this embodiment is in charge of an image reading process of optically reading a paper document and converting it into an image signal and some of image processes for the read image signal, and inputs the image signal to the management PC 101 via a LAN 109. The management PC 101 can also be implemented by a normal PC and incorporates an image storage unit, image processing unit, display unit, and input unit. The management PC 101 may partially or wholly be integrated with the MFP 100.

A management PC 101 can incorporate various kinds of storage means such as a RAM (Random Access Memory) or hard disk storage device so that input image data, vector data generated from image data, or information about a vectorization process result can be held.

Figure 2:
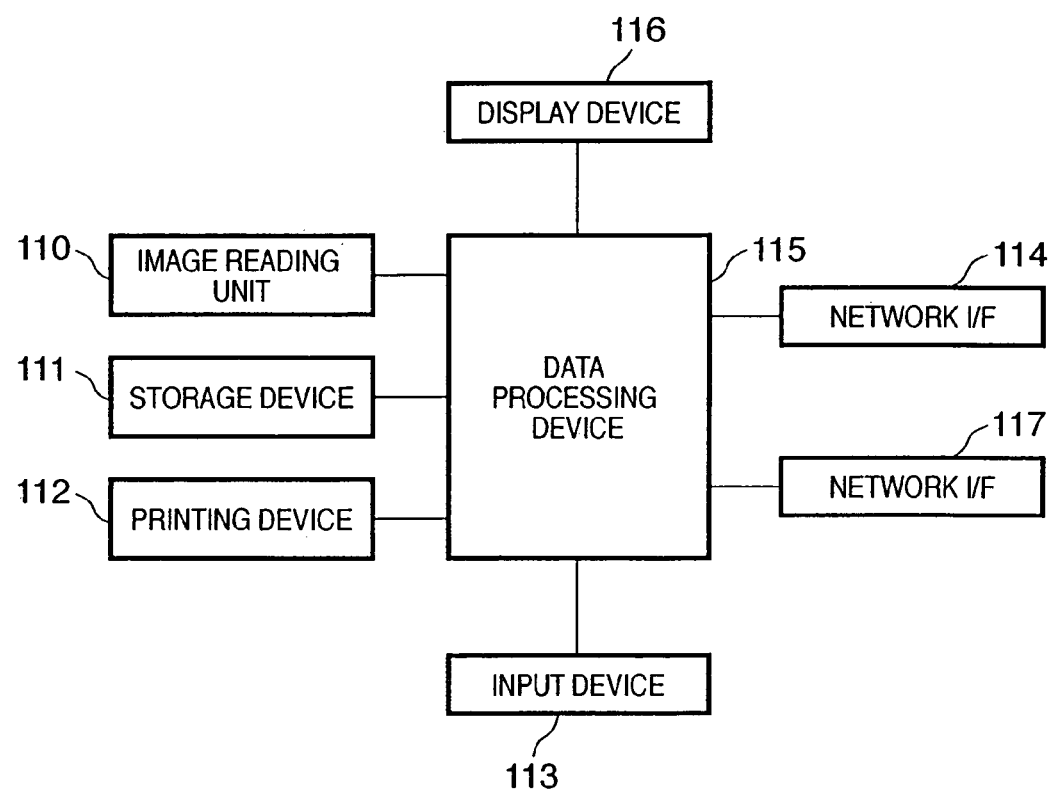
FIG. 2 is a block diagram showing the arrangement of an MFP 100 according to the embodiment of the present invention.

FIG. 2 is a block diagram showing the arrangement of an MFP 100 according to the embodiment of the present invention. An operator's instruction to the MFP 100 is input through an input device 113 such as keys equipped on the MFP 100 or an input device including a keyboard and mouse of the management PC 101. The series of operations is controlled by a controller in a data processing device 115.

Referring to FIG. 2, an image reading device 110 including an auto document feeder (to be abbreviated as an "ADF" hereinafter) irradiates a document image on each of one or a plurality of stacked documents with light from an internal light source, forms an image of light reflected by the document on a solid-state image sensing element via a lens, and obtains an image reading signal in the raster order as image information (e.g., a bitmap image) at a resolution of, e.g., 600 dpi from the solid-state image sensing element. When a normal copying function is used, the data processing device 115 executes an image process of that image signal to convert it into a recording signal. In case of a multi-copying process, recording data of one page is temporarily stored in a storage device 111 and sequentially output to a printing device 112, and then images are formed on paper sheets.

Print data output from a client PC 102 is input from a LAN 107 to the MFP 100 and to the data processing device 115 via a network I/F 114 and converted into recordable raster data by the data processing device 115. The raster data is then input to the printing device 112 to form a recording image on a paper sheet.

Status of operation inputs and image data whose process is underway are displayed on a display device 116 of the MFP 100 or on the monitor of the management PC 101 or client PC 102. The storage device 111 stores image data which is read by the image reading device 110 and processed by the data processing device 115. The data processing device 115 comprises a CPU, ROM, and RAM and holds a control program and various kinds of data according to this embodiment. The storage device 111 can also be controlled from the management PC 101. Data exchange and control between the MFP 100 and management PC 101 are done by using a network I/F 117 and a directly connected LAN 109.

[Outline of Image Process]

Figure 3:
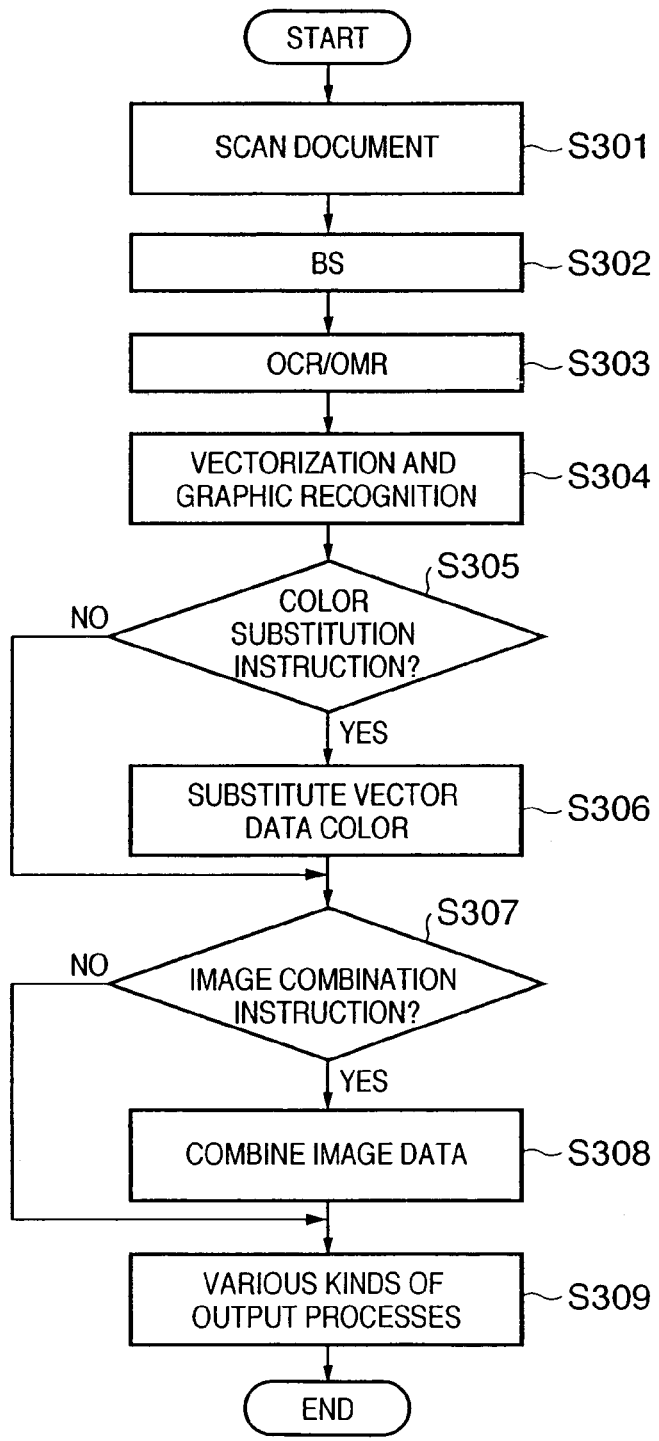
FIG. 3 is a flowchart for explaining the image process procedures of the image processing system according to the embodiment of the present invention.

An outline of the entire image process of the image processing system according to the embodiment of the present invention will be described below. FIG. 3 is a flowchart for explaining the image process procedures of the image processing system according to the embodiment of the present invention. A process of acquiring image information by reading a paper document, vectoring the image information, and outputting information about the conversion process result will be described with reference to the flowchart in FIG. 3.

The image reading device 110 of the MFP 100 is operated to scan one document in a raster order to obtain an, e.g., 8-bit image signal of 600 dpi (document scan process: step S301). This image signal undergoes a pre-process by the data processing device 115 and is saved as image data (e.g., a bitmap image) of one page in the storage device 111.

A CPU in the data processing device 115 or the CPU of the management PC 101 separates text/line art portions and halftone image portions from the image signal stored in the storage device 111. Each text portion is further separated into blocks combined as clusters for the respective paragraphs or tables and graphics formed of lines. The separated parts are segmented. On the other hand, each image portion expressed by halftone is segmented into independent objects for the respective so-called blocks such as an image portion and background portion which are separated into rectangles (BS process: step S302). The BS process in step S302 is not limited to the above-described process contents. The process of segmenting the image data into regions (blocks) for the respective properties may be executed by other procedures.

An OCR/OMR process is executed to recognize the character size, style, and font of the text block. The character code, character type, and text object location information of each character contained in the document image are generated and saved in the storage device 111 (step S303).

A vectorization process and graphic recognition process are performed (step S304). In the vectorization process, vectorization is executed for each rectangle (block), each color, or each object. That is, the vectorization process is a conversion process from image data (bitmap image) to vector data so that the data is converted into a digital file close to the original digital file.

In this embodiment, the character size, style, and font of the text block which has undergone the OCR/OMR process in step S303 are recognized. By using an outline font, the data is converted into font data which are visually faithful to characters read by scanning the document so that vector data is generated. For a table or graphic block formed of lines, the edge is extracted, and the outline is specified to generate vector data. An image block such as a photo is processed as an individual JPEG file as image information. These vectorization processes are done for the respective objects, and layout information of each object is saved in the storage device 111 as a digital file.

It is determined whether a substitution color is designated (step S305). If a substitution color is designated (YES in step S305), a vector data color substitution process is executed (step S306). If no substitution color is designated (NO in step S305), the flow advances to step S307.

Figure 20:
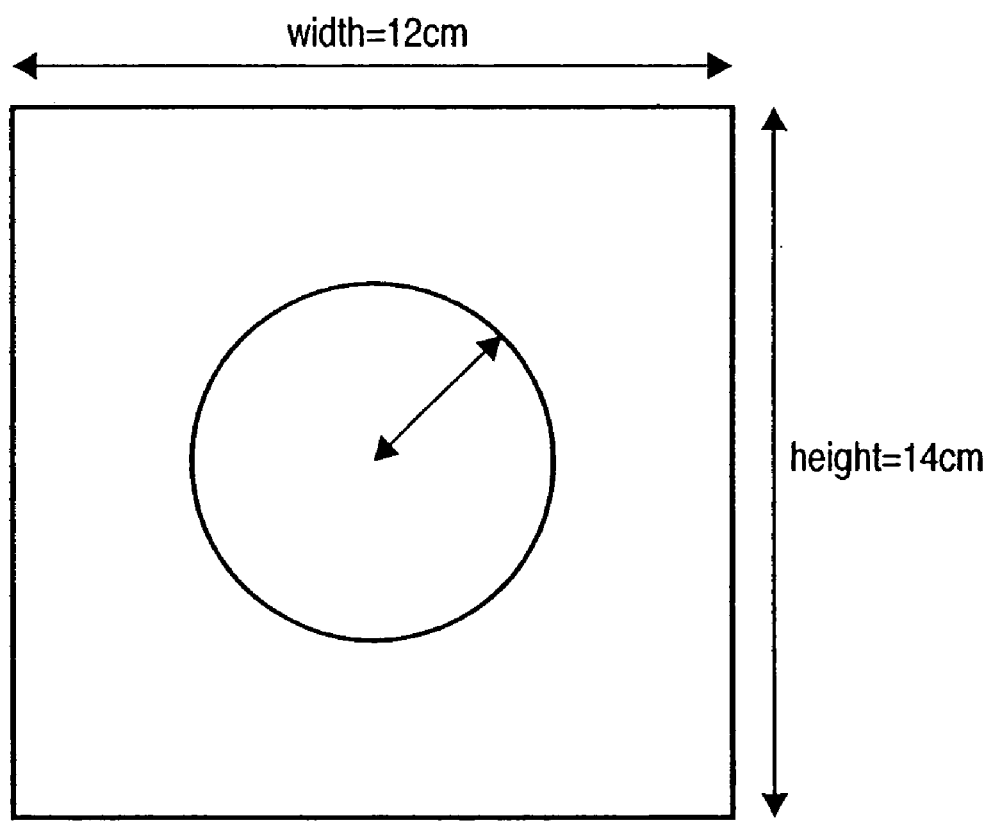
FIG. 20 is a view showing an example of a graphic drawn by the SVG vector data shown in FIG. 4.

In the vector data color substitution process in step S306, a process of converting the color of already generated vector data is executed. In this embodiment, all vector data are converted into, e.g., red. FIG. 4 is a view showing an example of SVG vector data as data after vector conversion. FIG. 20 is a view showing an example of a graphic drawn by the SVG vector data shown in FIG. 4. When the SVG vector data (vector data of a circle) shown in FIG. 4 is data after vector conversion, the color property "stroke=blue" of an XML tag "<circle" that represents a circle is rewritten to "stroke=red" indicating red. After the color substitution process is ended, the flow advances to step S307.

The method of changing the color of vector data is not limited to the above-described color substitution process. For example, the color property may be set to "stroke=red" in advance in generating the vector data shown in FIG. 4 by the vectorization process in step S304.

It is determined in step S307 whether an image combination instruction is present. If it is determined that an image combination instruction is present (YES in step S307), an image data combination process is executed (step S308), and the flow advances to step S309. If it is determined that no image combination instruction is present (NO in step S307), the flow advances to step S309.

Figure 5:
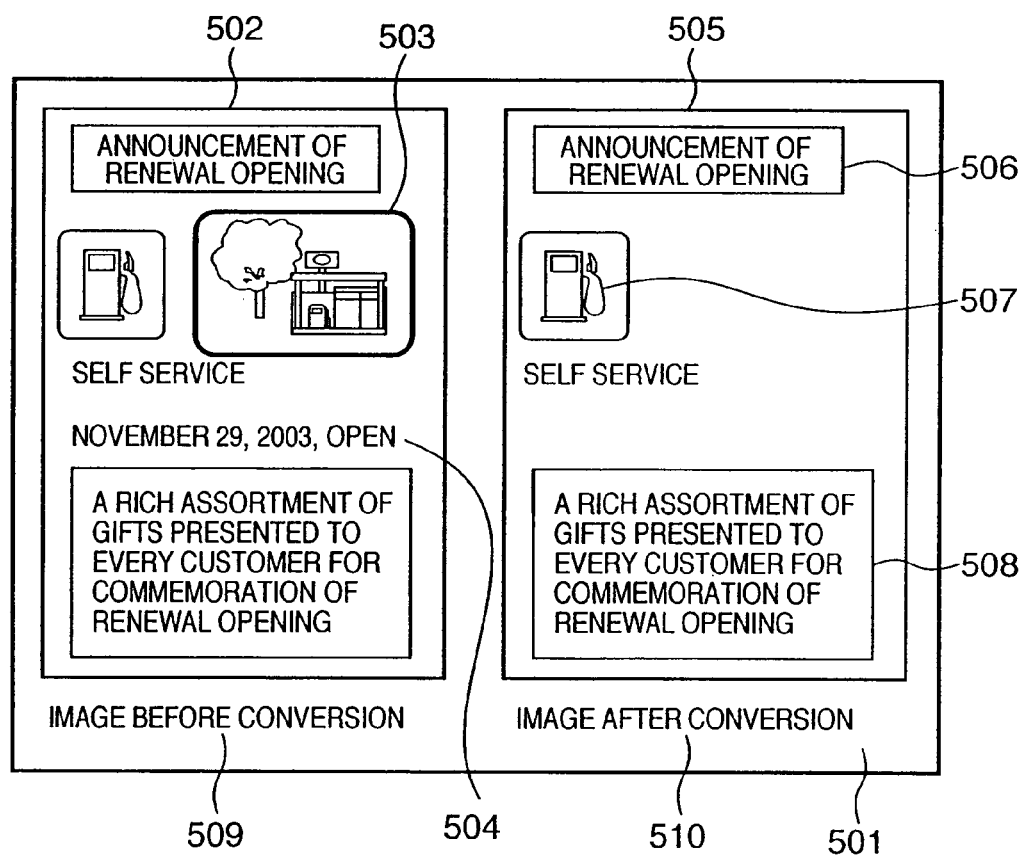
FIG. 5 is a view showing an example of image data combined by an image data combination process according to the embodiment.
Figure 6:
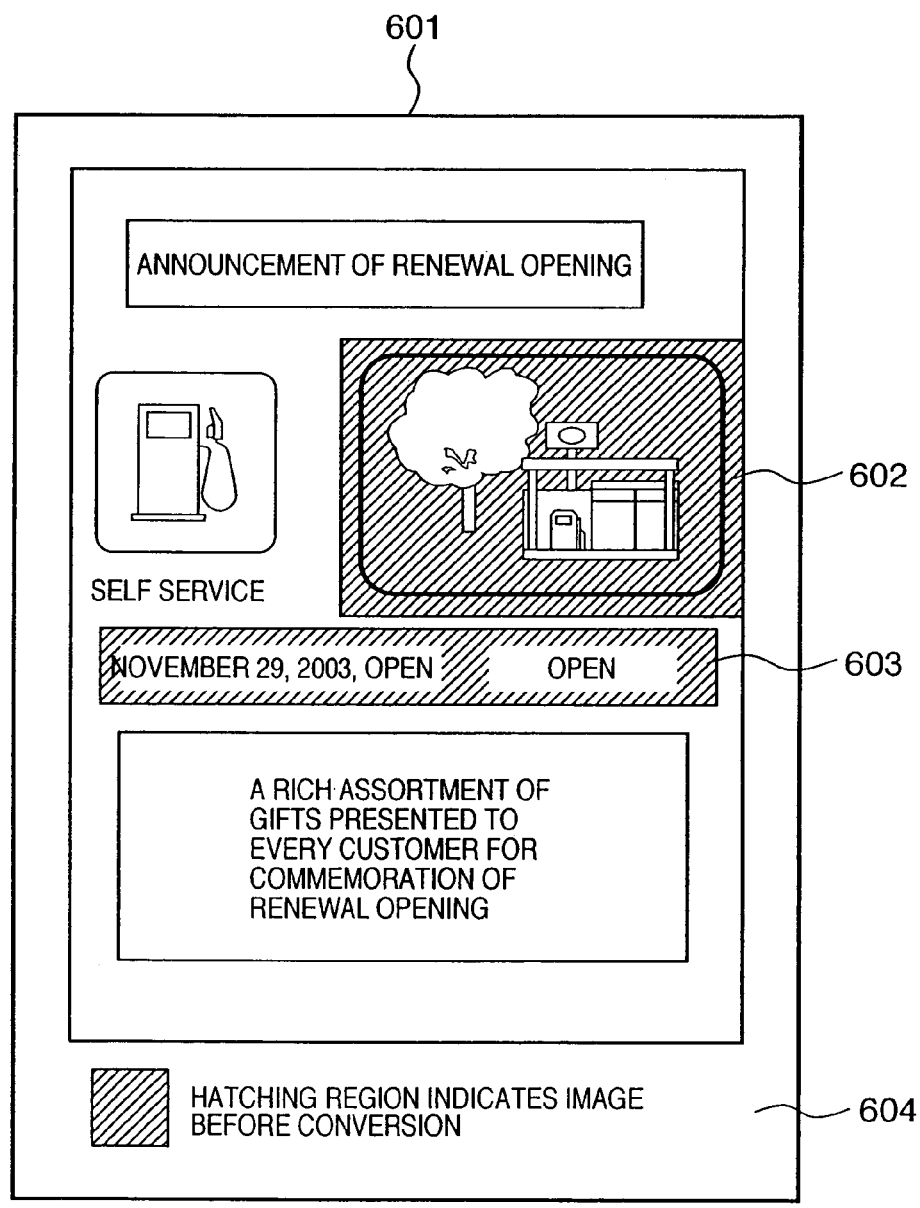
FIG. 6 is a view showing an example of image data combined by the image data combination process according to the embodiment.

In the image data combination process in step S308, the vector data generated in step S304 is temporarily converted into bitmap raster image data and combined with original image data before vector conversion. FIGS. 5 and 6 are views showing an example of image data combined by the image data combination process according to this embodiment. The image data combination process will be described later in detail.

In step S309, various kinds of output processes (manipulation, accumulation, transmission, and printing) are executed. More specifically, a process for input color or grayscale bitmap image data, vector data, or a vector conversion process result (e.g., the number of converted objects or an object type such as a table or graphic) is executed.

As described above, in the image processing system according to this embodiment, image data, vector data, and a vector conversion process result are converted in accordance with the format of the output destination such that the user can identify at a glance whether vectorization is appropriately done by instantaneously comparing an image object before vector conversion and an image object after vector conversion. The data are converted into, e.g., a bitmap image for printing, PDL (Page Description Language), a data format for e-mail, or an HTML (Hyper Text Markup Language) format which can be referred to by the Web browser of a remote PC. These processes will be described later in detail.

In the next step, each data converted into vector data is transmitted to the printing device 112 shown in FIG. 2 or to an e-mail client or the client PC 102 incorporating a Web browser through a network by the e-mail transmission function or Web server function of the management PC 101 (through an e-mail server). Details of the e-mail transmission function and Web server function are known, and a description thereof will be omitted. When a Web client or e-mail client on a PC connected to a network is used instead of printing a vectorization process result on a paper sheet, the convenience of the image processing system to convert a bitmap image into vector data can greatly be increased. In addition, the cost can largely be reduced.

When these processes are executed, the information amount can be reduced as compared to a case wherein a bitmap image is used. As a result, the accumulation efficiency can be improved, and the transfer time can be shortened. In addition, the data can be reproduced as high-quality data when it is printed or displayed. In the printing process, vector data needs to be converted into raster image data. This will be described later in detail. The processes described in this embodiment are implemented by the management PC 101 and its display device and peripheral devices. However, the present invention is not limited to this. The processes may be implemented by the data processing device 115, display device 116, and input device 113 of the MFP 100. Each process will be described below in detail.

[Block Selection Process]

Figure 7:
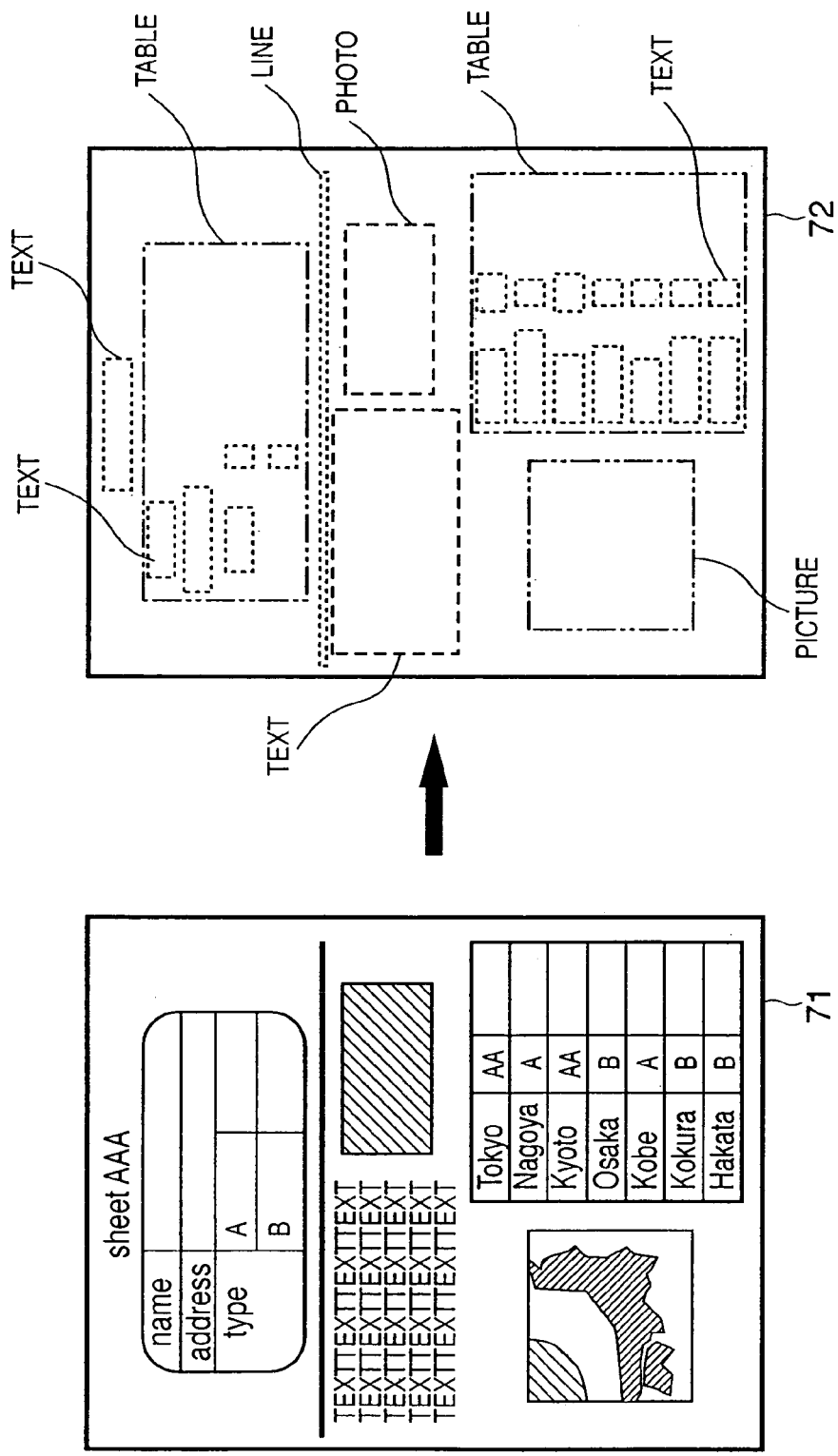
FIG. 7 is a view showing a state wherein read image data of one page is segmented into a plurality of blocks by a block selection process by determining properties.

FIG. 7 is a view showing a state wherein read image data of one page is segmented into a plurality of blocks by a block selection process by determining properties. More specifically, in the block selection process, image data 71 of one page read in step S301 is recognized as a cluster 72 of objects, and the properties of the respective blocks are determined as text (TEXT), photo (PHOTO), line (LINE), table (TABLE), and the like so that the image data is segmented into regions (blocks) having different properties.

An embodiment of the block selection process will be described below.

An input image is binarized to monochrome image data. Outline tracking is executed to extract a cluster of pixels surrounded by black pixels. For a black pixel cluster having a large area, outline tracking is executed for white pixels in that cluster to extract a cluster of white pixels. A cluster of black pixels is also extracted recursively from a white pixel cluster having a predetermined area or more. The above-described process is executed for a document having black characters printed on a white background. A document of another type can be processed in the same way by setting the color corresponding to the background to "white" and that corresponding to an object to "black".

The obtained black pixel clusters are classified into regions having different properties in accordance with their sizes and shapes. For example, a pixel cluster having an aspect ratio of almost 1 and a size in a predetermined range is determined as a pixel cluster corresponding to a character. Furthermore, a portion where neighboring characters regularly line up and can be regarded as a group is determined as a text region. A low-profile pixel cluster is categorized as a line region. A range occupied by a black pixel cluster which includes rectangular white pixel clusters which regularly line up and have a predetermined size or more is categorized as a table region. A region where pixel clusters with indeterminate forms are distributed is categorized as a photo region. A cluster with an arbitrary shape is categorized as a graphic region. With this process, more advanced limits can be imposed for reuse of digital data created by reading one document.

FIG. 8 is a table showing an example of block information of respective blocks obtained by the block selection process. Information of each block shown in FIG. 8 is used as information for vectorization or search to be described later.

[Vectorization Process]

The vectorization process in step S304 in FIG. 3 will be described next. For a text block, a character recognition process is executed for each character.

<<Character Recognition Process>>

For the character recognition process, in this embodiment, an image extracted for each character is recognized by using one of pattern matching methods, thereby obtaining a corresponding character code. In this recognition process, an observation feature vector obtained by converting a feature obtained from a character image into a several-ten-dimensional numerical value string is compared with a dictionary feature vector obtained in advance for each character type, and a character type with a shortest distance is output as a recognition result. Various known methods are available for feature vector extraction. For example, a method of dividing a character into a mesh pattern and counting character lines in respective meshes as line elements depending on their directions to obtain a (mesh count)-dimensional vector as a feature can be used.

When character recognition is to be executed for a text region extracted by the block selection process (step S302), the writing direction (horizontal or vertical direction) of the region is determined. Lines are extracted in the direction. Then, character images are obtained by extracting characters. In determining the writing direction (horizontal or vertical direction), horizontal and vertical projections of pixel values in that region are calculated. If the variance of the horizontal projection is larger than that of the vertical projection, the region is determined as a horizontal writing region. Otherwise, the region is determined as a vertical writing region.

Decomposition into character strings and characters is done in the following way. For horizontal writing, lines are extracted by using the horizontal projection. In addition, characters are extracted on the basis of the vertical projection for each extracted line. For a vertical writing text region, the relationship between "horizontal" and "vertical" is reversed. The character size can be detected on the basis of the extracted size.

<<Font Recognition Process>>

A plurality of sets of dictionary feature vectors for the number of character types used in character recognition are prepared in correspondence with character shape types, i.e., font types, and a font type is output together with a character code upon matching, thus recognizing the font of a character.

<<Vectorization Process of Character>>

In this embodiment, in vectorizing a character, using a character code and font information obtained by the above-described character recognition and font recognition, the information of a character portion is converted into vector data by using outline data prepared in advance. When an input document image is a color image, the color of each character is extracted from the color image and recorded together with vector data.

With the above processes, image information which belongs to a text block can be converted into vector data with a nearly faithful shape, size, and color. Hence, high-quality character data can be handled.

<<Vectorization Process of Non-Text Portion>>

For a region which is determined as a drawing, line, or table region by the block selection process in step S302, the outline of each extracted pixel cluster is converted into vector data. More specifically, a point sequence of pixels which form an outline is divided into sections at a point considered as a corner, and each section is approximated by a partial line or curve. "Corner" indicates a point where the curvature is maximal.

Figure 9:
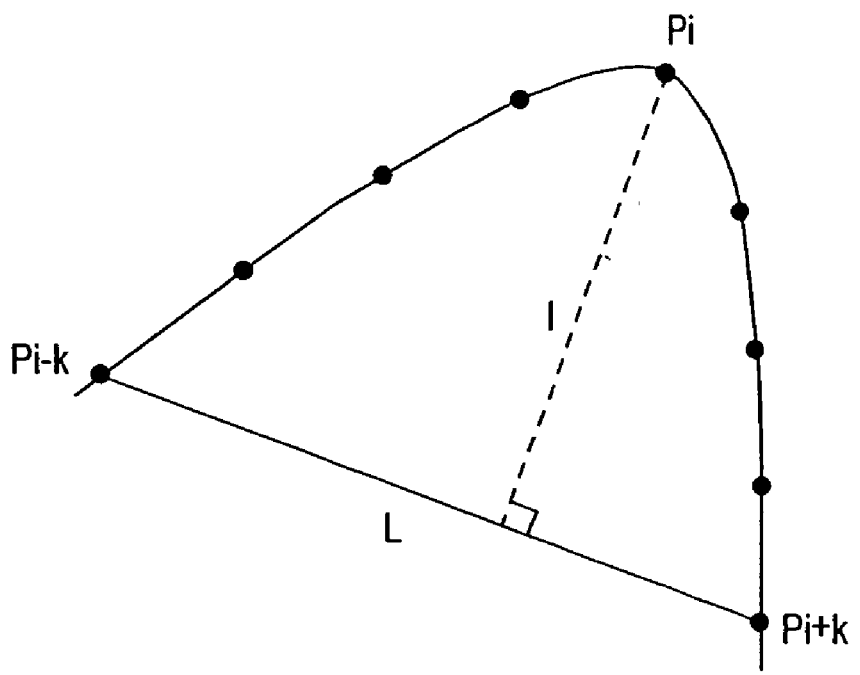
FIG. 9 is a view for explaining a point with a maximal curvature.

FIG. 9 is a view for explaining a point with a maximal curvature. As shown in FIG. 9, a chord is drawn between points Pi−k and Pi+k separated k points from an arbitrary point Pi to the left and right. A point with a maximal curvature is obtained as a point where the distance between the chord and the point Pi becomes maximal. Let R be the chord length/arc length between Pi−k and Pi+k. Then, a point where the value R is equal to or smaller than a threshold value can be regarded as a corner. Sections obtained by dividing the line at corners can be vectorized by using a method of least squares with respect to a point sequence for a line and a ternary spline function for a curve.

When the subject has an inner outline, it is similarly approximated by a partial line or curve by using a point sequence of a white pixel outline extracted by the block selection process.

As described above, when partial line approximation of outlines is used, the outline of a graphic with an arbitrary shape can be vectorized. When the input document is a color document, the color of each graphic is extracted from the color image and is recorded together with vector data.

Figure 10:
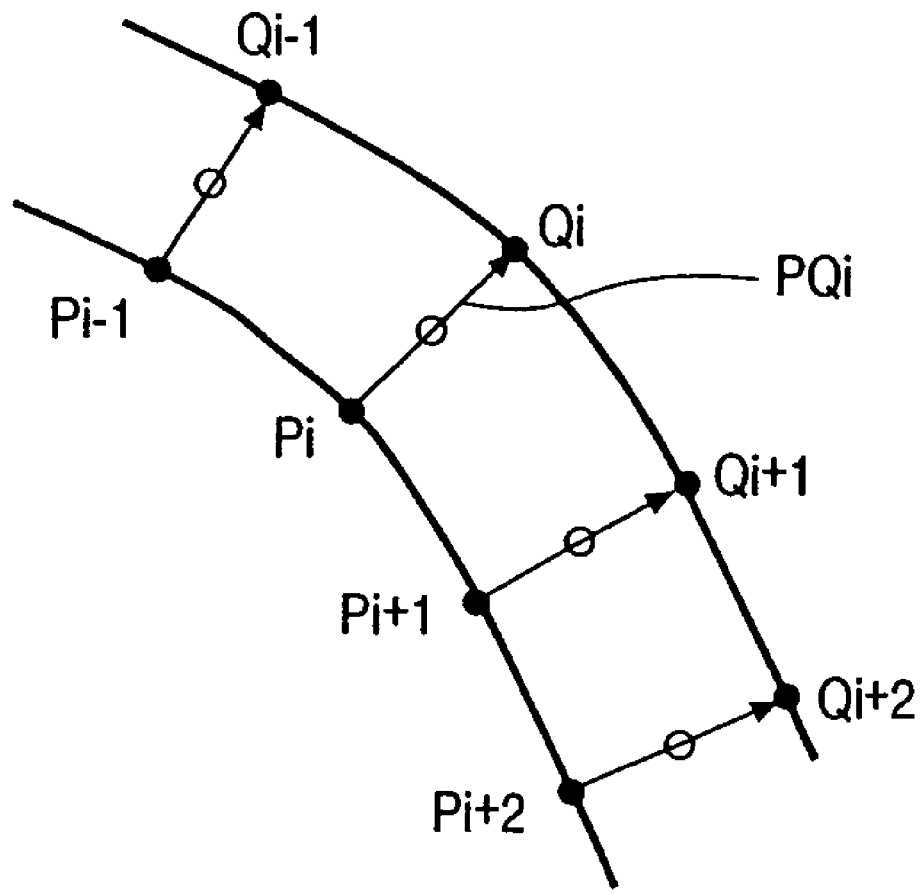
FIG. 10 is a view for explaining an example wherein an outer outline which is close to an inner outline or another outer outline is expressed as a line with a given width.

FIG. 10 is a view for explaining an example wherein an outer outline which is close to an inner outline or another outer outline is expressed as a line with a given width. When an outer outline is close to an inner outline or another outer outline in a given section, as shown in FIG. 10, the two outlines can combined and expressed as a line with a given width. More specifically, lines are drawn from points Pi on a given outline to points Qi on another outline such that two corresponding points have the shortest distance. When distances PQi maintain a predetermined value or less on the average, the section of interest is approximated by a line or curve using PQi middle points as a point sequence, and the average value of the distances PQi is set as the width of the line or curve. A line or a table ruled line as a set of lines can efficiently be expressed by vector data as a set of lines having a given width, as described above.

In vectorization using the character recognition process for a text block, a character which has the shortest distance from a dictionary as a result of the character recognition process is used as a recognition result, as described above. When this distance is equal to or larger than a predetermined value, the recognition result does not always match an original character, and a wrong character having a similar shape is often recognized. In this embodiment, therefore, such character is handled in the same manner as a general line art, as described above, and converted into outline data. That is, even a character that causes a recognition error in the conventional character recognition process can be vectorized on the basis of outline data which is visually faithful to image data (bitmap image) without being vectorized to a wrong character. In this embodiment, a block which is determined as a photo is not vectorized and is output as image data (bitmap image) without any process.

Figure 12:
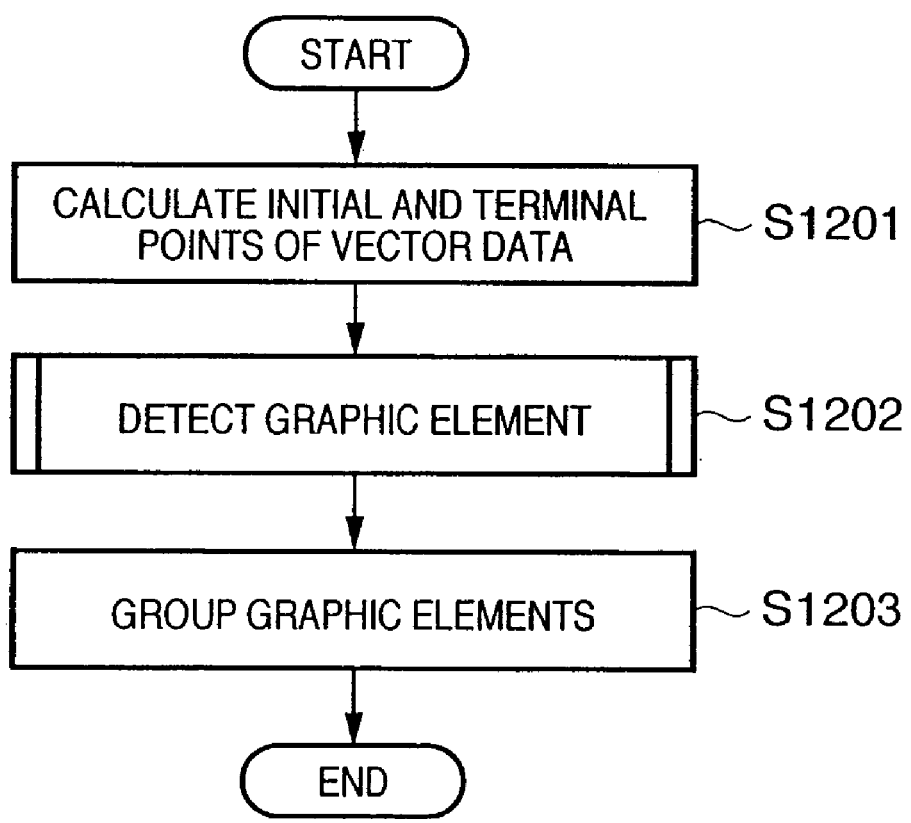
FIG. 12 is a flowchart for explaining process procedures executed until vector data are grouped for each graphic object.

A result obtained by executing the block selection process (step S302) and vectorization process (step S304) for a bitmap image of one page is converted into a file having an intermediate data format as shown in FIG. 12. In this embodiment, this data format will be referred to as a document analysis output format (DAOF).

Figure 11:
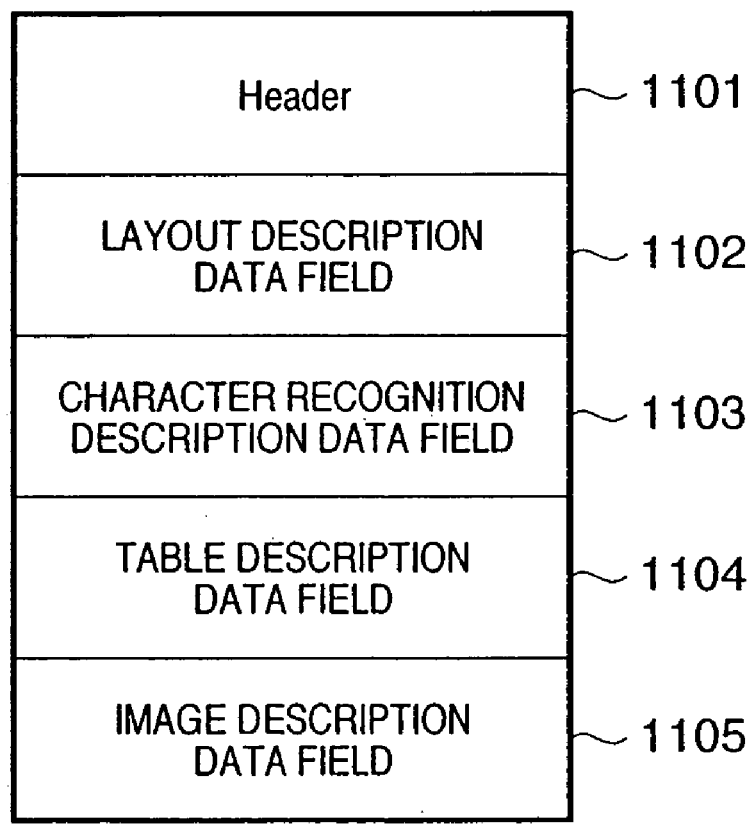
FIG. 11 is a view showing a DAOF data structure.

FIG. 11 is a view showing the data structure of a file having an intermediate data format as a result obtained by converting image data of one page by the block selection process (step S302) and the vectorization process (step S304). The data format shown in FIG. 11 is called a document analysis output format (DAOF). That is, FIG. 11 shows the DAOF data structure.

Referring to FIG. 11, reference numeral 1101 denotes a Header which holds information about document image data to be processed. Reference numeral 1102 denotes a layout description data field which holds property information and rectangular block address information of blocks in the document image data, which are recognized for the properties such as TEXT (text), TITLE (title), CAPTION (caption), LINEART (line art), PICTURE (natural image), FRAME (frame), and TABLE (table). A character recognition description data field 1103 holds character recognition results obtained by executing character recognition of TEXT blocks such as TEXT, TITLE, and CAPTION. A table description data field 1104 stores details of the structure of TABLE blocks. An image description data field 1105 extracts and holds bitmap images of PICTURE blocks or LINEART blocks.

[Graphic Recognition Process]

A process of grouping vectorized partial lines for each graphic object after the outline of a graphic with an arbitrary shape is vectorized, as described above, will be described below.

FIG. 12 is a flowchart for explaining process procedures executed until vector data are grouped for each graphic object. Initial and terminal points of each vector data are calculated (step S1201). Using the initial and terminal point information of respective vectors, a graphic element is detected (step S1202). Detecting a graphic element is to detect a closed graphic formed by partial lines. Detection is executed by applying the principle that each vector which forms a closed shape has vectors coupled to its two ends.

Next, other graphic elements or partial lines present in the graphic element are grouped to set one graphic object (step S1203). If any other graphic elements or partial lines are not present in the graphic element, the graphic element is set as a graphic object.

Figure 13:
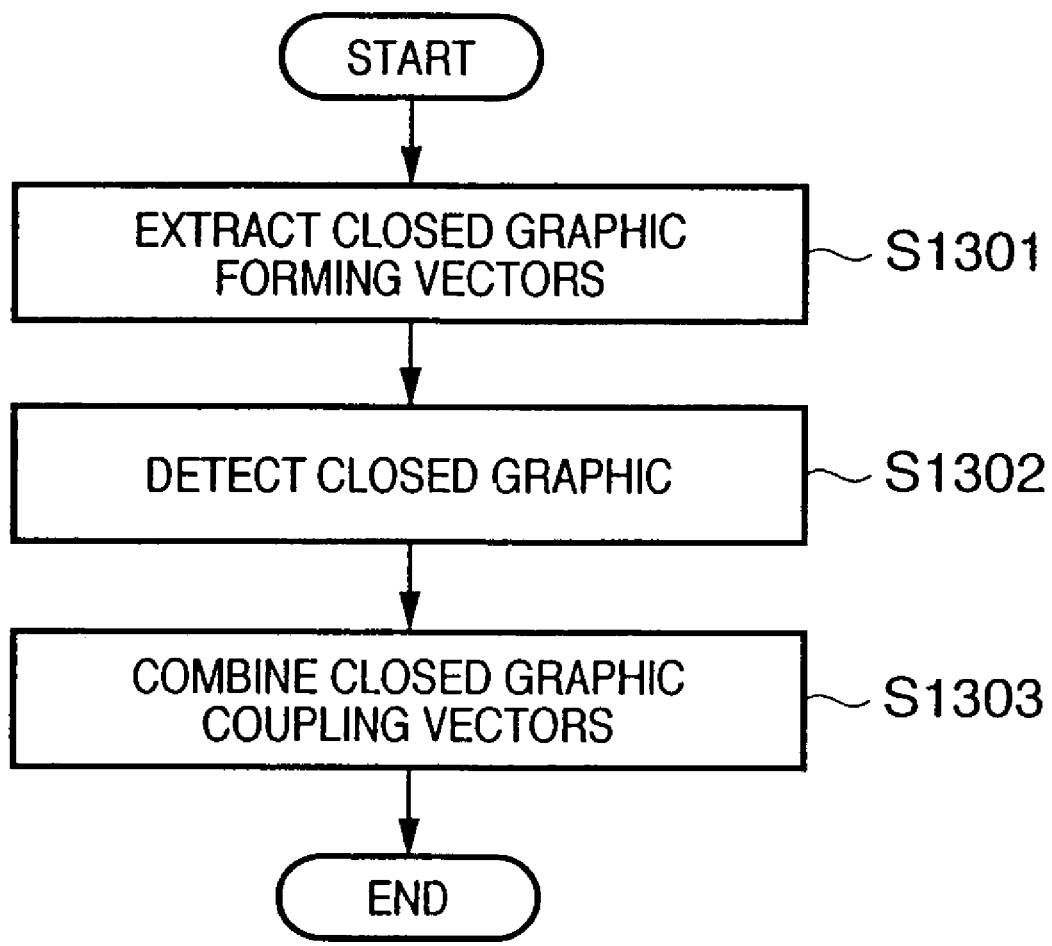
FIG. 13 is a flowchart for explaining process procedures (step S1202) of detecting a graphic element.

FIG. 13 is a flowchart for explaining details of process procedures (step S1202) of detecting a graphic element. Unwanted vectors each having two ends unconnected to other vectors are removed from vector data to extracted closed graphic forming vectors (step S1301). The initial point of a vector of interest of the closed graphic forming vectors is set as a start point, and vectors are sequentially tracked clockwise. This tracking is executed until returning to the start point. All passing vectors are grouped as a closed graphic which forms one graphic element (step S1302). All closed graphic forming vectors present in the closed graphic are also grouped. The initial point of a vector which is not grouped yet is set as a start point, and the above process is repeated. Finally, of the unwanted vectors removed in step S1301, those which join the vectors grouped as the closed graphic in step S1302 are detected and grouped as one graphic element (step S1303).

With the above process, a graphic block can be handled as an independently reusable graphic object.

[Image Data Combination Process]

In the image data combination process, vector data generated in step S304 is temporarily converted into bitmap raster image data and combined with original image data before vector conversion. The image data combination process will be described with reference to FIGS. 5 and 6.

In a combined image 501 shown in FIG. 5, the original image data and vector data are combined without superimposing them. Referring to FIG. 5, reference numeral 502 denotes a bitmap image data portion 502 of the original image; and 503, raster image data converted from vector data. In this embodiment, it is assumed that vectorization of the partial images 503 and 504 has failed. To indicate the original image, a character string "image before conversion" 509 is bitmapped under the original image 502.

Referring to FIG. 5, an image 505 is obtained by temporarily converting the vector data generated in step S304 into bitmap raster image data. In the example shown in FIG. 5, the image 505 contains only partial images 506, 507, and 508 which have successfully been vectorized. For the sake of simplicity, in the example shown in FIG. 5, when all the images in the blocks (rectangles) have successfully been vectorized, the image after conversion is displayed in the region of the image 505. Actually, when the image object of "tree" in the partial image 503 has successfully been vectorized, the image object of "tree" is embedded in the image 505 after conversion on the right side.

In an image 601 shown in FIG. 6, the original image and vector data are combined by superimposing them. When the image is expressed by a monochrome image in the output form shown in FIG. 6, and image portions which have successfully been converted and portions where conversion has failed are superimposed simply under an OR condition, the difference cannot visually be recognized. In this embodiment, measures are taken to allow discrimination at a glance, as shown in FIG. 6.

For example, when partial images of the original image for which vectorization has failed are displayed, hatching patterns are superimposed on partial image regions 602 and 603. With this arrangement, the user can easily discriminate the parts where vectorization has failed at a glance. As detailed image creation procedures, pixels for which vectorization has successfully be done in the original image are filled with white. A hatching pattern is superimposed on the pixel region. Vector data obtained by vector conversion is converted into raster image data and superimposed on the original image data. Instead of using hatching, the data may be converted into gray data so that the user can easily discriminate the unvectorized portions.

The embodiment has been described on condition that the printing device to output an image outputs a monochrome image. A description will be done on condition that the printing device serving as an image output means has a capability of processing a color image. In this case, in the example shown in FIG. 5, the original image and vectorized image are output in different colors to make the user discriminate. Alternatively, different color property values are assigned to objects which have successfully be vectorized and objects for which vectorization has failed. Or only the luminance component of the original image is extracted and converted into a grayscale image. Next, the vector data obtained by vector conversion is overwritten on the original image without changing the color. The vector data may be converted into a specific color by a vector data color conversion process. That is, the color property value of an vectorized object may be converted into a color property value different from the color property of the object.

[Various Kinds of Output Processes]

Details of various kinds of output processes such as manipulation, accumulation, transmission, and recording in step S309 in FIG. 3 will be described next.

<<Raster Image Data Conversion Process of Vector Data>>

A process of converting vector data into raster image data will be described by using SVG vector data in FIG. 4 and an SVG drawing example in FIG. 20.

FIG. 4 shows SVG vector data described by an SVG (Scalable Vector Graphics) description format standardized by the W3C Committee which is promoting standardization of the Internet. The data processing unit provided in the management PC 101 in FIG. 1 or the data processing device 115 of the MFP 100 in FIG. 2 includes a parser process of analyzing SVG vector data. The parser analyzes an object described by vector data (e.g., data sandwiched between <svg> and </svg>), executes a rendering process, and stores the data in the storage device 111 as raster image data.

For example, object data shown in FIG. 4 indicates a circle having a radius of 4 cm and a blue line without filling, which is drawn in a rectangular region with a width of 12 cm and a height of 14 cm while setting the center of the circle at a point separated 6 cm horizontally and 7 cm vertically from the upper left corner. For the raster image data conversion process of vector data, a rendering function (e.g., a circle rendering function) corresponding to the parser result is executed. For example, a circle rendering function is executed for the above-described SVG vector data, an image shown in FIG. 7 is stored in the RAM in the data processing device 115 or management PC or the storage device 111.

<<Printing Process of Vector Data>>

The process flow until vector data is printed will be described. For example, the vector data shown in FIG. 4 is converted into raster image data by the above-described raster image data conversion process of vector data and stored in the storage device 111. After that, raster image data shown in FIG. 20 is printed on a printing paper sheet by the printing device 112.

<<Printing Target>>

Figure 14:
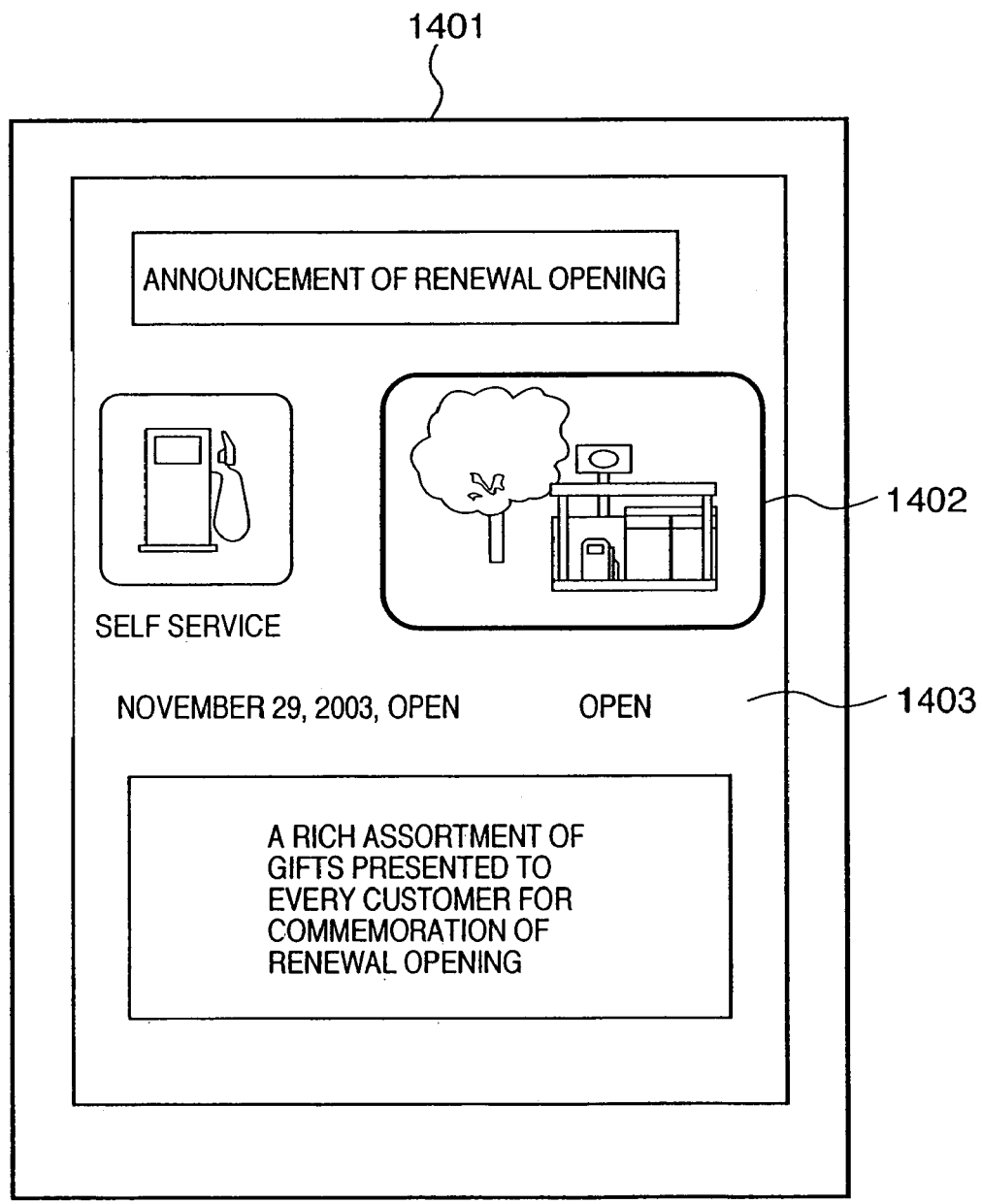
FIG. 14 is a view showing an example of original image data.
Figure 15:
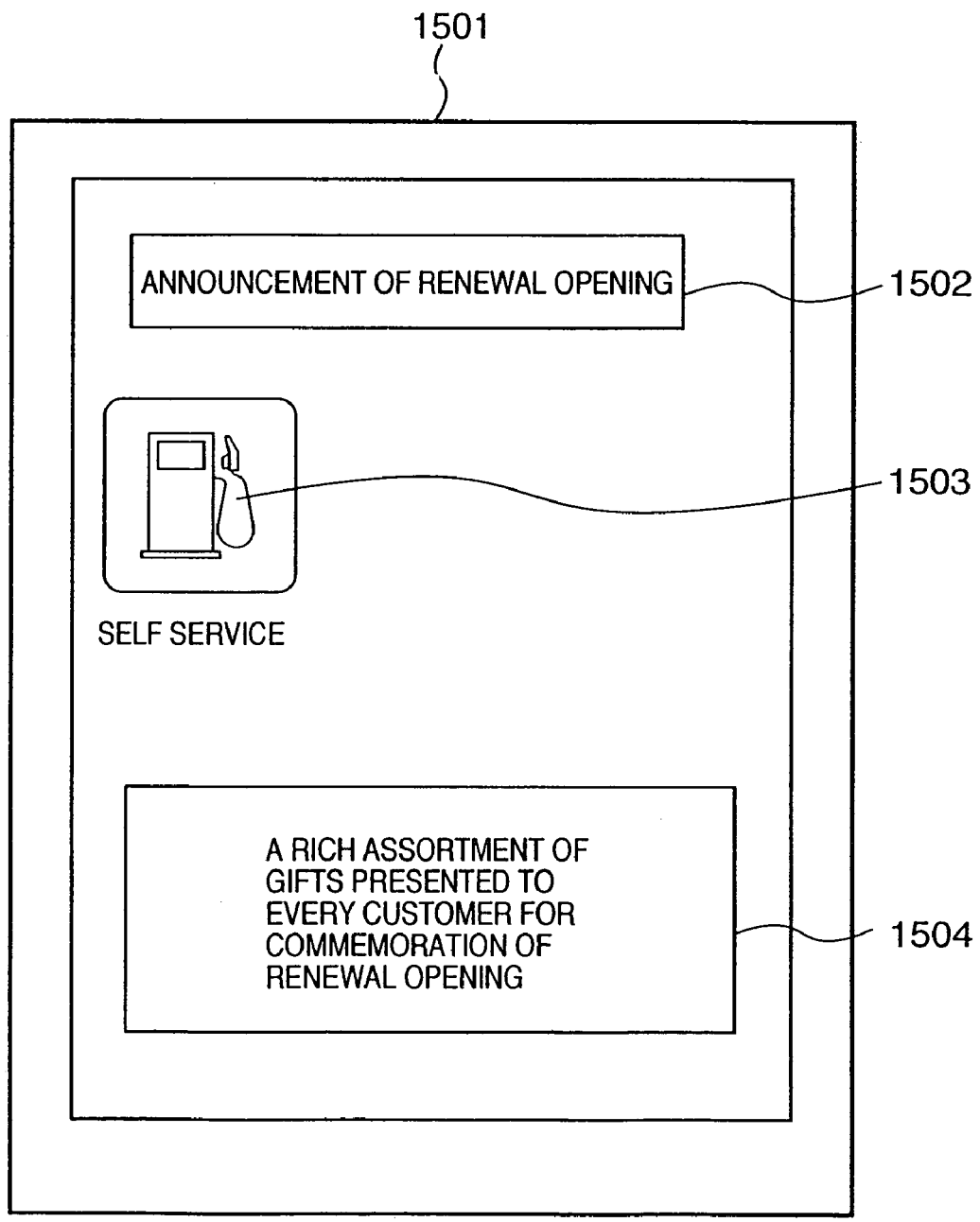
FIG. 15 is a view showing an image of vector data obtained by vectoring the original image shown in FIG. 14.

How to print original image data, vector data obtained by vector conversion, and vector conversion result information will be described below by using several detailed examples of print patterns. FIG. 14 is a view showing an example of original image data. FIG. 15 is a view showing an image of vector data obtained by vectoring the original image shown in FIG. 14. FIG. 16 is a view showing conversion result information obtained by creating a report of the vector conversion result.

<Pattern 1>

(1) For example, the image shown in FIG. 14 is printed as an original image.

(2) Next, for example, the image shown in FIG. 15 is printed as vector data.

<Pattern 2>

(1) For example, the image shown in FIG. 14 is printed as an original image.

(2) Next, for example, the image shown in FIG. 15 is printed as vector data.

(3) For example, the report shown in FIG. 16 is printed as conversion result information.

Patterns to print image data generated by the image data combination process (step S308) in the flowchart shown in FIG. 3 upon receiving an image data combination instruction will be described next.

<Pattern 3>

(1) For example, the combined image shown in FIG. 5 is printed.

<Pattern 4>

(1) For example, the combined image shown in FIG. 5 is printed.

(2) For example, the report shown in FIG. 16 is printed as conversion result information.

<Pattern 5>

(1) For example, the combined image shown in FIG. 6 is printed.

<Pattern 6>

(1) For example, the combined image shown in FIG. 6 is printed.

(2) For example, the report shown in FIG. 16 is printed as conversion result information.

In the above-described print patterns, any printing layout (e.g., double-sided printing or printing of a plurality of images on one printing surface) or any printing order can be employed. The type of the executed vectorization process (e.g., a line art or table) may be added as notes. The type of the process of an unvectorized object (e.g., an image) may be added as notes.

<<Conversion Result Information>>

Information exacted before original image data is converted into vector data is output (printed or transmitted by an Internet protocol such as e-mail transmission or HTML data transmission) as, e.g., the vector data conversion result report shown in FIG. 16. The display contents include the total number of converted objects (except the number of characters), the number of regions including character strings, the number of text objects, the number of table objects, the number of graphic objects, and the number of image objects such as a raster image. The above process is executed for each block (rectangle) recognized in the BS (block selection) process (step S302) in the flowchart shown in FIG. 3. Information (e.g., an object size) other than those described above may be added, or only some of the pieces of information described above may be output.

<<E-Mail Data Conversion>>

How to convert original image data, vector data obtained by vector conversion, and vector conversion result information into e-mail data will be described below with reference to FIG. 17. FIG. 17 is a view showing an example of e-mail data. E-mail data is text data totally described by character codes and is divided by delimiter strings "- - -Boundary- - -".

Referring to FIG. 17, an e-mail header is described in the region above a first delimiter string 171. In the region above a second delimiter string 172, mail contents, job number, image processing device name, process date/time, process time, attached file contents, and vector data conversion result report information representing the conversion process result of vectorization and graphic recognition (step S304) in the flowchart shown in FIG. 3 are described.

In the region above a third delimiter string 173, the TIFF (Tagged Image File Format) data file of the original image shown in FIG. 14 is converted from binary data into character strings by BASE64 conversion. The data may be a JPEG image.

In the region under a fourth delimiter string 174, SVG (Scalable Vector Graphics) data as vector data shown in FIG. 15 is converted from binary data into character strings by BASE64 conversion. The data may be a TIFF or JPEG image obtained by converting vector data into raster data.

FIG. 18 is a view showing an example of e-mail data converted from combined image data. Referring to FIG. 18, the regions above a second delimiter string 182 are the same as in FIG. 17. Referring to FIG. 18, in the region above a third delimiter string 183, the JPEG data file of an image obtained by combining the original image shown in FIG. 14 or 15 and vector data is converted from binary data into character strings by BASE64 conversion.

<<HTML Data Conversion>>

To transmit original image data, vector data obtained by vector conversion, vector conversion result information, or combined image data to a Web client on a remote PC through a Web server, the data must temporarily be converted into HTML data. This conversion process will be described briefly with reference to FIG. 19.

FIG. 19 is a view showing an example of HTML data. Referring to FIG. 19, mail contents, job number, image processing device name, process date/time, process time, and attached file contents are described up to 11th line, like the above-described e-mail data. <P><IMG src="images/iRC3200_9999.tif"></P> of the 13th line is the TIFF file of the original image data, like the e-mail data shown in FIG. 17. <P><IMG src="images/iRC3200_9999.svg"></P> of the 15th line is the SVG file as vector data. The vector data conversion result report is described from the 16th line, like the e-mail data.

As described above, according to this embodiment, the image processing system which converts a bitmap image into vector data need not always include an expensive display device. Hence, the cost can be reduced, and the convenience of the image processing system can be increased. For example, even when an MFP such as a copying machine or facsimile apparatus with a multifunction is given a function of converting a bitmap image into vector data, any increase in cost can be suppressed by using the above-described method to confirm the vector data conversion result.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, the user can easily confirm conversion result information when image information is converted into vector data.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-200807 filed on Jul. 7, 2004, the entire contents of which are hereby incorporated by reference herein.

What is claimed is:

1. An image processing apparatus comprising:
an input unit adapted to input image information including a plurality of image blocks;
a memory adapted to store the image information including the plurality of image blocks inputted by the input unit;
a type recognizing unit adapted to recognize a first type of image blocks to be vectorized or a second type of image blocks not to be vectorized, the first type of image blocks and the second type of image blocks being included in the plurality of image blocks stored in the memory;

a location recognizing unit adapted to recognize locations of the plurality of image blocks on the inputted image information;

a vectorization unit adapted to attempt to vectorize the first type of image blocks recognized by the type recognizing unit;

a superimposing unit adapted to superimpose specific image information on image blocks of the first type that the vectorization unit fails to vectorize, the specific image information enabling a user to visually discriminate image blocks of the first type that are successfully vectorized and image blocks of the first type that the vectorization unit has failed to vectorize; and an output unit adapted to output image information including the first type of image blocks which are successfully vectorized and the first type of image blocks on which the specific image information is superimposed so that the vectorized image blocks and the superimposed image blocks are located on the outputted image information based on the locations recognized by the location recognizing unit.

2. The apparatus according to claim 1,
wherein the output unit transmits e-mail data, to which is attached data including the first type of image blocks which are vectorized and the first type of image blocks on which the specific image information is superimposed, to a designated address.

3. The apparatus according to claim 1, wherein the input unit inputs the image information obtained by optically reading a paper document.

4. The apparatus according to claim 1, wherein the output unit outputs the image information so that a color of one of the first type of image blocks for which vectorization by the vectorization unit has succeeded differs from a color of another of the first type of image blocks for which vectorization by the vectorization unit has failed.

5. An image processing method comprising:
using a computer to perform steps including:
an input step of inputting image information including a plurality of image blocks;
a storing step of storing the image information, including the plurality of image blocks inputted in the inputting step, into a memory;
a type recognizing step of recognizing a first type of image blocks to be vectorized or a second type of image blocks not to be vectorized, the first type of image blocks and the second type of image blocks being included in the plurality of image blocks;
a location recognizing step of recognizing locations of the plurality of image blocks on the inputted image information;
a vectorization step of attempting to vectorize the first type of image blocks recognized in the type recognizing step;
a superimposing step of superimposing specific image information on image blocks of the first type that have failed to vectorize in the vectorization step, the specific image information enabling a user to visually discriminate image blocks of the first type that are successfully vectorized and image blocks of the first type that have failed to vectorize in the vectorization step; and an output step of outputting image information including the first type of image blocks which are successfully vectorized, and the first type of image blocks on which the specific image information is superimposed so that the vectorized image blocks and the superimposed image blocks are located on the outputted image information based on the locations recognized in the location recognizing step.

6. The method according to claim 5, wherein the output step outputs the image information so that a color of one of the first type of image blocks for which vectorization in the vectorization step has succeeded differs from a color of another of the first type of image blocks for which vectorization in the vectorization step has failed.

7. A program stored in a non-transitory computer-readable storage medium causing a computer to which image information is input to execute:
an input procedure of inputting image information including a plurality of image blocks;
a type recognizing procedure of recognizing a first type of image blocks to be vectorized and a second type of image blocks not to be vectorized, the first type of image blocks and the second type of image blocks being included in the plurality of image blocks;
a location recognizing procedure of recognizing locations of the plurality of image blocks on the inputted image information;
a vectorization procedure of attempting to vectorize the first type of image blocks recognized in the type recognizing procedure;
a superimposing procedure of superimposing specific image information on image blocks of the first type that the vectorization procedure fails to vectorize, the specific image information enabling a user to visually discriminate image blocks of the first type that are successfully vectorized and image blocks of the first type that the vectorization procedure has failed to vectorize; and
an output procedure of outputting image information including the first type of image blocks which are successfully vectorized and the first type of image blocks on which the specific image information is superimposed so that the vectorized image blocks and the superimposed image blocks are located on the outputted image information based on the locations recognized in said the location recognizing procedure.

8. The program according to claim 7, wherein the output procedure outputs the image information so that a color of one of the first type of image blocks for which vectorization in the vectorization procedure has succeeded differs from a color of another of the first type of image blocks for which vectorization in the vectorization procedure has failed.

* * * * *